(12) United States Patent
Phillips et al.

(10) Patent No.: US 7,019,859 B2
(45) Date of Patent: Mar. 28, 2006

(54) SYSTEM AND METHODS FOR AUTOMATICALLY ORDERING PRINT MEDIA

(75) Inventors: Quintin T. Phillips, Boise, ID (US); Joseph L. Burquist, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 857 days.

(21) Appl. No.: 09/879,340

(22) Filed: Jun. 11, 2001

(65) Prior Publication Data

US 2002/0186406 A1    Dec. 12, 2002

(51) Int. Cl.
*G06F 15/00* (2006.01)

(52) U.S. Cl. .................................... 358/1.15; 358/1.14
(58) Field of Classification Search ................ 358/721; 399/12, 24, 25, 27; 705/27, 26; 709/224; 347/7, 50

See application file for complete search history.

(56) References Cited

U.S. PATENT DOCUMENTS 6,584,290 B1 *  6/2003  Kurz et al. .................... 399/12
6,798,997 B1 *  9/2004  Hayward et al. ............. 399/12

* cited by examiner

*Primary Examiner*—Gabriel Garcia

(57) ABSTRACT

A printer system uses a statistical routine to determine when to automatically place an order for additional print media or warn a user about placing such an order. The system collects print media usage data and correlates it with user-defined parameters to determine when and how much print media should be ordered. The automatic tracking and ordering of print media supplies provides just-in-time management of print media inventories that reduces overall printing costs.

28 Claims, 5 Drawing Sheets

SYSTEM AND METHODS FOR AUTOMATICALLY ORDERING PRINT MEDIA

TECHNICAL FIELD

The present invention relates to ordering print media and, more particularly, to controlling the timing and size of automatic print media orders using a statistically derived prediction that is based on prior media usage information.

BACKGROUND

Printing devices utilize a number of different types of consumable items. These items include print media, marking agents and rotating components that deteriorate over time as a result of wear and tear. Consumable print media include paper of varying weights and different types of high-value media such as transparencies and glossy photo paper. Consumable marking agents include ink, wax, powder toner, thermal agents, and the like, that are typically housed in some type of cartridge such as a toner cartridge.

Print media and marking agent consumables are consumed with each printed page as part of the printed product. As a result, these consumables require replacement more often than other consumable components. In many printing operations, especially larger ones, keeping track of print media and marking agent supplies to ensure that printing devices can continue to print is an important and costly task. Monitoring inventories of print media and marking agents can require a significant investment in man-hours. In addition, the cost of maintaining a supply of these consumable items often amounts to a considerable percentage of an overall printing budget. Large sums of money can be tied up in consumable printing materials as they sit on the floor waiting to be used. Therefore, overall printing costs can be reduced by using a just-in-time inventory, which reduces inventory costs while eliminating human resources dedicated to inventory control.

Unfortunately, methods of just-in-time inventory management for print media consumables are generally quite human resource intensive. The typical method of managing a print media inventory involves a user or administrator monitoring supplies and placing orders for additional supplies based on an estimation of when current supplies will be depleted. Another method, implemented by software running on a print device or computer, involves a simple counting and subtraction routine. A user enters an "available" amount of print media and a "warning" amount of print media. The warning amount indicates when the user wants to be warned about ordering more print media. The routine counts down from the available amount by subtracting one page for each page printed. When the warning amount is reached, the print device displays a warning telling the user that another supply of print media should be ordered. After ordering and receiving the new supply of print media, the user enters the new available amount of print media, and the process repeats.

There are several disadvantages with these methods of managing a print media inventory. Neither method assists the user in estimating when an order should be placed for more print media. The user engages in a trial and error process to determine when it is best to place an order, trying to avoid the two extremes of running out of print media and having too much available print media. Running out of media can be devastating to a printing operation, while having too much available media in storage increases inventory costs. In addition, both of these methods require considerable user input which increases human resource costs.

Accordingly, the need exists for a way to provide just-in-time inventory management of print media that tracks media supplies and usage and reduces both inventory and human resource costs.

SUMMARY

A printer system uses a statistical routine to determine when to automatically place an order for additional print media or warn a user about placing such an order. The system provides just-in-time inventory management of print media which helps reduce overall printing costs. Less money and storage space are tied up with fully stocked inventories, and user input is minimized to reduce the amount of human resources dedicated to inventory control.

The system provides for the entry of media related parameters that are used in calculating when to automatically place an order for print media or warn the user to place an order. The parameters include the initial amount of available print media, a notification limit that indicates the number of days typically involved in placing and receiving an order, and a confidence level that indicates the user's tolerance for running out of print media before a new supply is received.

In addition to using parameters entered by a user, the system gathers information on daily print media usage and develops a statistical distribution of the number of pages of media that are printed each day. The system uses a look-up table to correlate the confidence level parameter provided by a user with a daily page usage tolerance limit in the distribution. The usage tolerance limit for a specified confidence level provides the system with an estimate of the daily print media usage. The system subtracts the usage tolerance limit for the appropriate number of days from the previously entered available media supply to determine the number of days remaining before the initial supply of print media will be depleted. Based on the notification limit parameter entered by the user, the system determines each day whether it is time to automatically place an order for more print media supplies or to warn the user to place the order.

Orders are placed automatically by dialing a vendor telephone number or by locating the vendor URL (uniform resource locator) over a network such as the Internet. Information including order details and the user's identification are transferred to the vendor. The system can be set to query the user regarding the amount of supplies to be ordered, or it can default to re-ordering the same initial amount. Typically, both vendor and user identification information are previously stored in the system. When the system is not set up to automatically place an order, it instead provides a warning to the user. The user then manually places the order by transferring the appropriate information to the vendor.

In an alternate embodiment, the system governs the timing and size of print media orders by the use of marking agent consumables (e.g., a toner cartridge). In this embodiment, a toner cartridge includes a memory tag having a processor, a memory, and an antenna coil or connection point. The toner cartridge also includes a detector which monitors the toner supply level and notifies the system when the supply level nears depletion. A low toner signal prompts an automatic ordering process for a new toner cartridge. In addition, the system uses the low toner signal to prompt an automatic ordering process for additional print media supplies.

Similar media related parameters as discussed above are used in calculating the amount of print media supplies to be ordered. The system gathers information on daily print media usage and develops a statistical distribution of the number of pages of media that are being printed by the cartridge. This information, as well as the entered parameters, are typically stored on the system memory, but can also be stored on the memory tag of the toner cartridge. When the system receives a low toner signal from the toner cartridge, it determines an appropriate amount of media to be ordered. The amount of media to be ordered is determined by correlating a user's confidence level with a statistical distribution of the amounts of media expended by all the cartridges up through and including the current cartridge. Over time, the statistical distribution of the number of media pages printed by toner cartridges becomes more normalized, and the determination of how much print media to be ordered with each new toner cartridge becomes more accurate.

BRIEF DESCRIPTION OF THE DRAWINGS

The same reference numbers are used throughout the drawings to reference like components and features.

DETAILED DESCRIPTION

The system and methods described herein relate to automatically placing orders for print media supplies and determining the timing and sizes of those orders. The system collects print media usage data and correlates it with user-defined parameters to determine when and how much print media should be ordered. In the alternative, the system provides a warning so a user can manually place an order for more print media. The automatic tracking and ordering of print media supplies provides just-in-time management of print media inventories that reduces overall printing costs.

Exemplary System for Automatically Placing Print Media Orders

Figure 1:
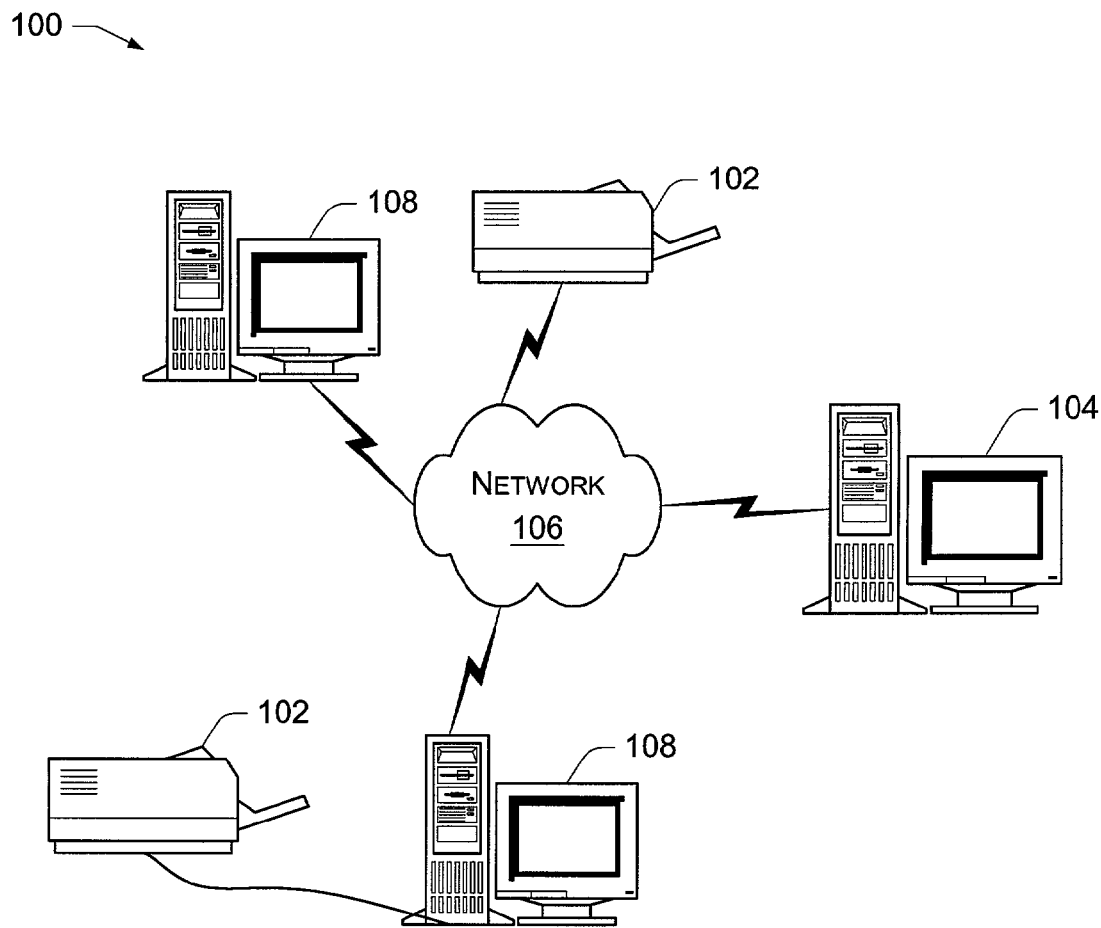
FIG. 1 illustrates a vendor system coupled to printing devices as a suitable system environment in which print media can be ordered automatically.

FIG. 1 illustrates an example of a printing system 100 in an environment that is suitable for automatically placing print media orders. The system 100 includes printer device(s) 102 coupled to a vendor system 104 through a network connection 106. Printer device(s) 102 are also typically coupled to a host computer(s) 108 either through a direct or network connection. Network connections 106 can include LANs (local area networks), WANs (wide area networks), an intranet, the Internet, or any other suitable communication link.

The invention is applicable to various types of printing devices that make use of assorted print media and marking agents during the printing process. Consumable print media includes paper of varying weights, and different types of high-value media, such as transparencies and glossy photo paper. Consumable marking agents include ink, wax, powder toner, thermal agents, and the like, that are typically housed in some type of cartridge, such as a toner cartridge. Therefore, printer device(s) 102 can include devices such as copiers, fax machines and scanners, and may also include multifunction peripheral (MFP) devices which combine the functionality of two or more peripheral devices into a single device.

In general, the host computer 108 outputs host data to the printer device 102 in a driver format suitable for the device 102, such as PCL or postscript. The printer device 102 converts the host data and outputs it onto an appropriate print media, such as described above. Upon determining that it is time to place an order for additional print media, the printer device 102 or host computer 108 automatically contacts the vendor system 104 and transfers the necessary identification information and order details. Alternatively, the printer device 102 or host computer 108 provides a warning to the system user so an order for additional print media can be manually placed.

Figure 2:
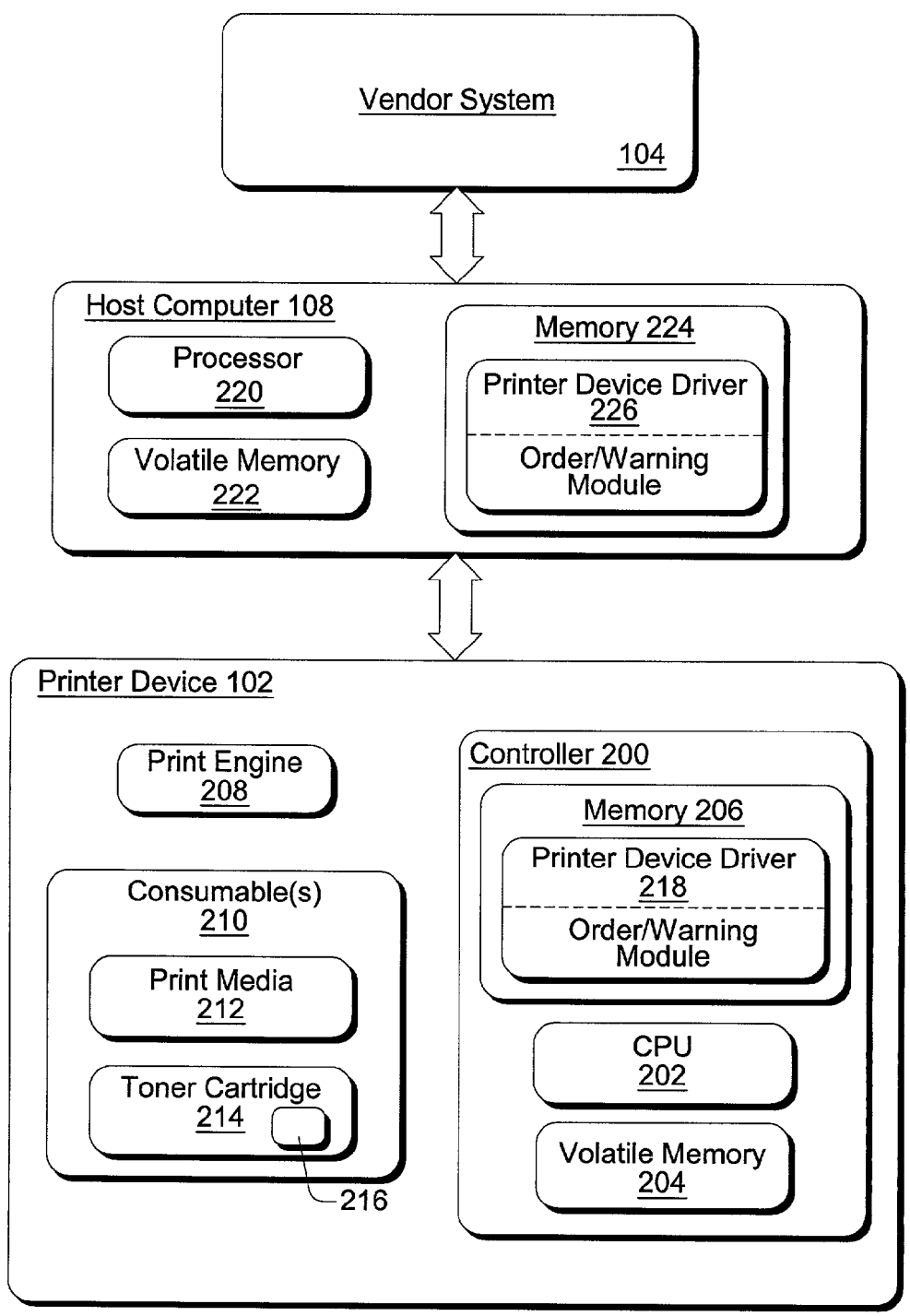
FIG. 2 is a block diagram illustrating a system such as that in FIG. 1.

FIG. 2 illustrates the printer system 100 in more detail. The printer device 102 has a controller 200 that processes the host data. The controller 200 typically includes a data processing unit or CPU 202, a volatile memory 204 (i.e., RAM), and a non-volatile memory 206 (e.g., ROM, Flash). Printer device 102 includes a print engine 208 and one or more consumable printing components 210. Consumable(s) 210 represent the various print media 212 and marking agents 214 (e.g., toner cartridges) as discussed above, whose supply levels decrease with each printed page output by print device 102. Other typical print device consumables such as photoconductors, transfer drums or belts, and fusers are not illustrated in FIG. 2.

Print media consumables 212 (e.g., paper, transparencies, glossy photo paper) are stored immediately prior to their use in one or more media trays (not shown) that can be internal or external to print device 102. Marking agent consumables 214, such as toner cartridges, include a detection device 216 that is configured to sense toner supply levels within the cartridge. The device 216 is typically located within the cartridge itself. Although detection device 216 can be any type of toner level sensor 216, it is preferably an antenna sensor device that measures supply levels within the cartridge by passing current through a plate capacitor antenna within the cartridge. The current induces voltage signals in coils within the cartridge that are proportional to the amount of toner present in the cartridge.

The printer controller 200 processes host data and manages the print process by controlling the print engine 208 and consumable(s) 210. Printer controller 200 includes printer driver software 218 executing on CPU(s) 202. The printer driver software 218 is stored in memory 206 and includes an order/warning module that executes to track print media usage data and determine when additional supplies of print media 212 should be ordered. When the order/warning module 218 calculates that it is time to place an order for print media 212 supplies, it either outputs a warning that reminds the user to place an order, or it automatically places the order itself, depending on a previously configured control parameter.

The order/warning module 218 controls the entry of various additional parameters used to configure the automatic order feature of the printer device 102. The types of parameters used to configure the automatic order feature may vary depending on the mathematical routines the order/ warning module 218 is programmed to perform. The order/warning module 218 can be configured to execute various statistical routines in calculating the appropriate time for placing a print media order. Therefore, general descriptions of calculations appearing throughout this disclosure are provided for illustrative purposes only, and are not meant to be a limitation on the number or extent of the statistical routines and calculations that the order/warning module 218 can be configured to perform.

An example calculation incorporates print media usage estimates from a sample distribution that is assumed to be statistically Normal. The order/warning module 218 develops the sample distribution by gathering daily media usage data from printer device 102. In general, such distributions indicate the frequency of values from different ranges of a variable. Therefore, the sample distribution is a daily print media usage distribution that indicates the frequency that certain amounts of print media are used over a range of days. Media usage data can also be gathered and analyzed on a per print-job basis.

A characteristic property of a Normal distribution is that 68% of all of its observations fall within a range of ±1 standard deviation from the mean, and 95% of all of its observations fall within a range of ±2 standard deviations from the mean. In other words, in a Normal distribution, observations that have a standardized value (a value expressed in terms of its difference from the mean, divided by the standard deviation) of less than −2 or more than +2 have a relative frequency of 5% or less.

The known characteristics of Normal distributions, and other statistical distributions, can be used to estimate the probability that a particular outcome will occur within the sampled population. Thus, in configuring the automatic order feature of the printer device 102, the order/warning module 218 requests a user confidence parameter that determines where within the daily print media usage distribution the user is comfortable. If the user enters a high confidence parameter, the order/warning module 218 knows that the user rarely, if ever, wants to run out of print media before receiving newly ordered supplies. For example, a 95% user confidence level indicates the user is willing to run out of print media 1 time in every 20 order occurrences, while a 99% confidence level means the user is willing to run out of print media only 1 time in every 100 order occurrences. A higher confidence level results in the order/warning module 218 placing media orders in a manner that is more likely to result in higher print media inventories, but less likely to result in the depletion of print media before more supplies are received.

A look-up table is used to correlate the user confidence parameter to a number in the daily media usage distribution. The daily media usage number is applied in a calculation to determine when an order for additional print media supplies should be placed. Clearly, such a calculation requires additional configuration parameters, such as an initial print media supply level and the number of days needed to fully process an order. The order/warning module 218 initially queries the user to enter values for whatever parameters are needed to complete the particular statistical calculation the module 218 is programmed to execute. The configuration parameters, along with vendor and user identification information are stored in nonvolatile memory 206. Vendor identification information typically includes a vendor uniform resource locator (URL), a telephone number, and other information useful in placing an order with a vendor.

The configuration and identification information can be input on print device 102, the host computer 108, or any suitable input device coupled to print device 102. Although the printer driver software 218 and order/warning module generally execute on print device 102, they may also be stored and execute on host computer 108 as illustrated by printer driver 226.

The host computer 108 includes a processor 220, a volatile memory 222 (i.e., RAM), and a non-volatile memory 224 (e.g., ROM, hard disk, floppy disk, CD-ROM, etc.). The host computer 108 may be implemented, for example, as a general-purpose computer, such as a desktop personal computer, a laptop, a server, and the like. The host computer 108 may implement one or more software-based printer drivers 226 that are stored in non-volatile memory 224 and executed on the processor 220 to configure data into an appropriate format (e.g., PCL, postscript, etc.) and output the formatted data to the printer device 102.

Figure 3:
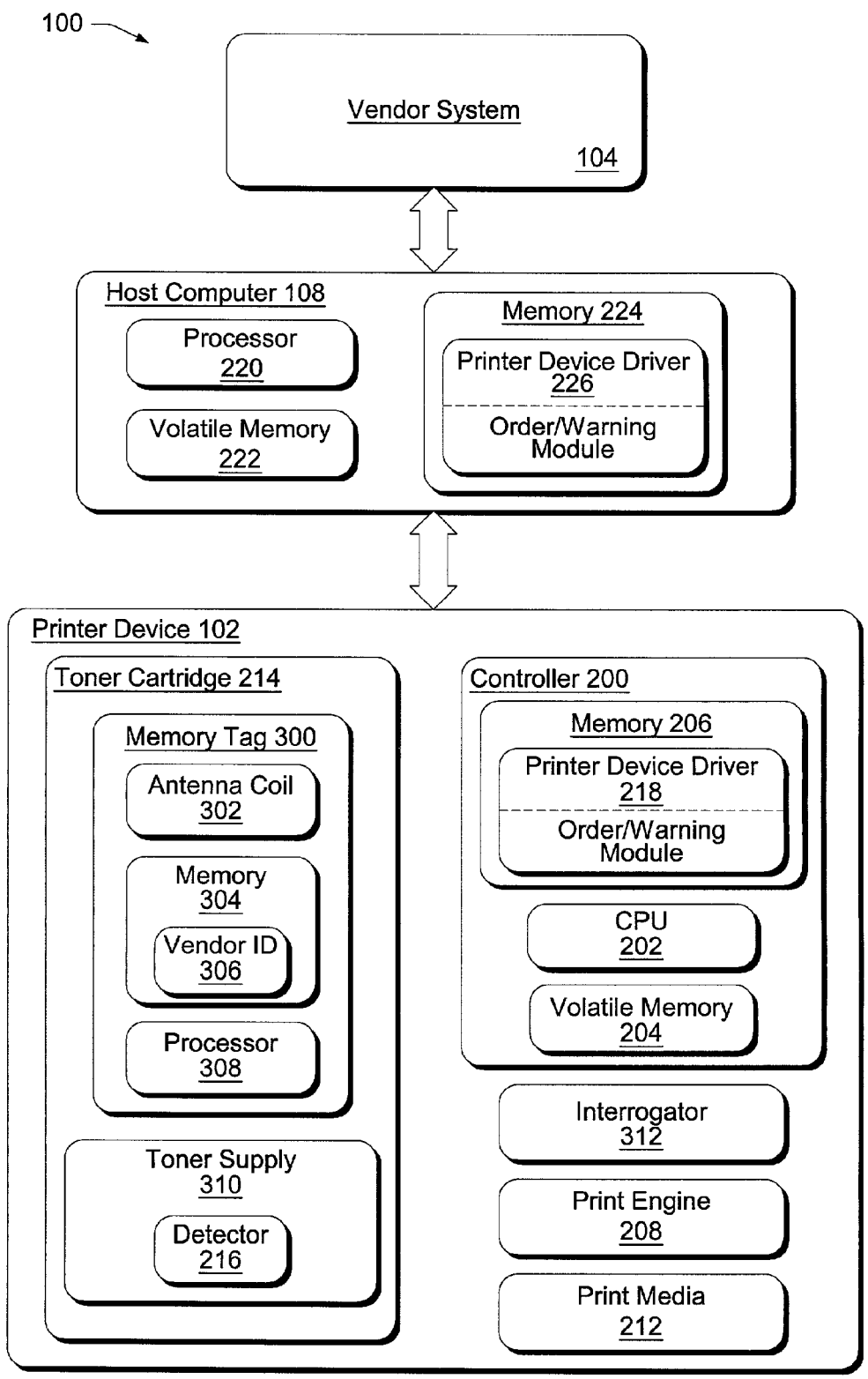
FIG. 3 is a block diagram illustrating an alternate embodiment of a system such as that in FIG. 1.

FIG. 3 illustrates additional details of an alternate embodiment of the printer system 100 of FIG. 1. In the embodiment of FIG. 3, the timing and size of print media orders depends on the life cycle and print media usage of a consumable toner cartridge 214 (i.e., marking agent). The system of FIG. 3 provides automatic ordering of both toner cartridges 214 and print media 212. The toner cartridge 214 detects when its toner supply 310 is low and initiates an automatic order process for a new toner cartridge 214. Each time a toner cartridge 214 is ordered, the system also places an order for more print media 212.

To facilitate automatic order placements, a toner cartridge 214 includes a memory tag 300 that is preferably a radio frequency identification (RFID) memory tag. RFID memory tags and their applications are well known in the art. The memory tag 300 includes an antenna coil 302, a memory 304 and a processor 306. However, the memory tag 300 may also include a connector or contact point (not shown) in place of the antenna coil 302 for purposes of accessing the memory tag 300. In addition to other items, the memory 304 stores vendor identification 308 information. Toner cartridge 214 also includes a detection device 216 configured to sense toner supply 310 levels within the cartridge as described above.

Printer device 102 is configured generally as described above with the exception of an interrogation device 312. In addition to processing host data and managing the print process by controlling print engine 208 and consumables 210, the printer controller 200 manages the interrogator 312. The interrogator 312 is designed to operate in conjunction with the RFID memory tag 300. The interrogator 312 emits a radio frequency field that provides power to the memory tag 300 through antenna coil 302. The memory tag 300, therefore, does not require its own power supply. The interrogator 312 also reads information from and writes information to memory tag 300 through antenna coil 302. Therefore, physical contact between the memory tag 300 and the print device 102 is not required for the print device 102 to communicate with the memory tag 300. However, as indicated above, a connector or contact point may be used as an alternative to the antenna coil 302. Thus, the interrogator 312 and print device 102 would communicate with the memory tag 300 through the connector or contact point.

The order/warning module 218 requests configuration parameters and gathers print media 212 usage data in a manner similar to that described above. However, in the alternate embodiment of FIG. 3, the order/warning module 218 is not configured to determine the timing of print media 212 orders (i.e., a low toner supply 310 signal from the toner cartridge 214 determines the timing of print media 212 orders). Instead, the order/warning module 218 is configured to determine the amount of print media 212 to be ordered along with each new toner cartridge 214. Therefore, the configuration parameters needed in calculations performed by the order/warning module 218 may differ from those needed for the previously described embodiment of FIG. 2.

For example, an initial print media supply level and the number of days to fully process an order are parameters that may not be relevant in the FIG. 3 embodiment, because they are related to when an order will be placed rather than the size of the order. However, because a user confidence parameter pertains to how often a user is willing to run out of print media 212 before receiving an addition supply, it is relevant to both a time based calculation and a quantity based calculation.

The order/warning module 218 gathers daily print media 212 usage data from printer device 102 and develops a statistical distribution on print media 212 usage per toner cartridge. The distribution is a print media usage distribution that indicates the frequency with which different amounts of print media are used over a range of toner cartridges. The range includes all previous toner cartridges 214 up through the current toner cartridge 214. Therefore, a user confidence parameter can be correlated to a "media-usage per toner-cartridge" number from the distribution. The order/warning module 218 can then calculate an amount of print media 212 to order with each newly ordered toner cartridge 214 that corresponds to the user's desired confidence level in not running out of print media 212.

The print media 212 usage data and configuration parameters may be stored on the toner cartridge 214 memory tag 300 and transferred to the print device 102 memory 206 each time a new toner cartridge 214 is installed, or it may be stored on the print device 102 memory 206 or the host computer 108 memory 224.

Exemplary Method for Automatically Placing Print Media Orders

An example method for determining when orders should be placed for print media supplies and placing those orders automatically will now be described with primary reference to FIG. 4.

Figure 4:
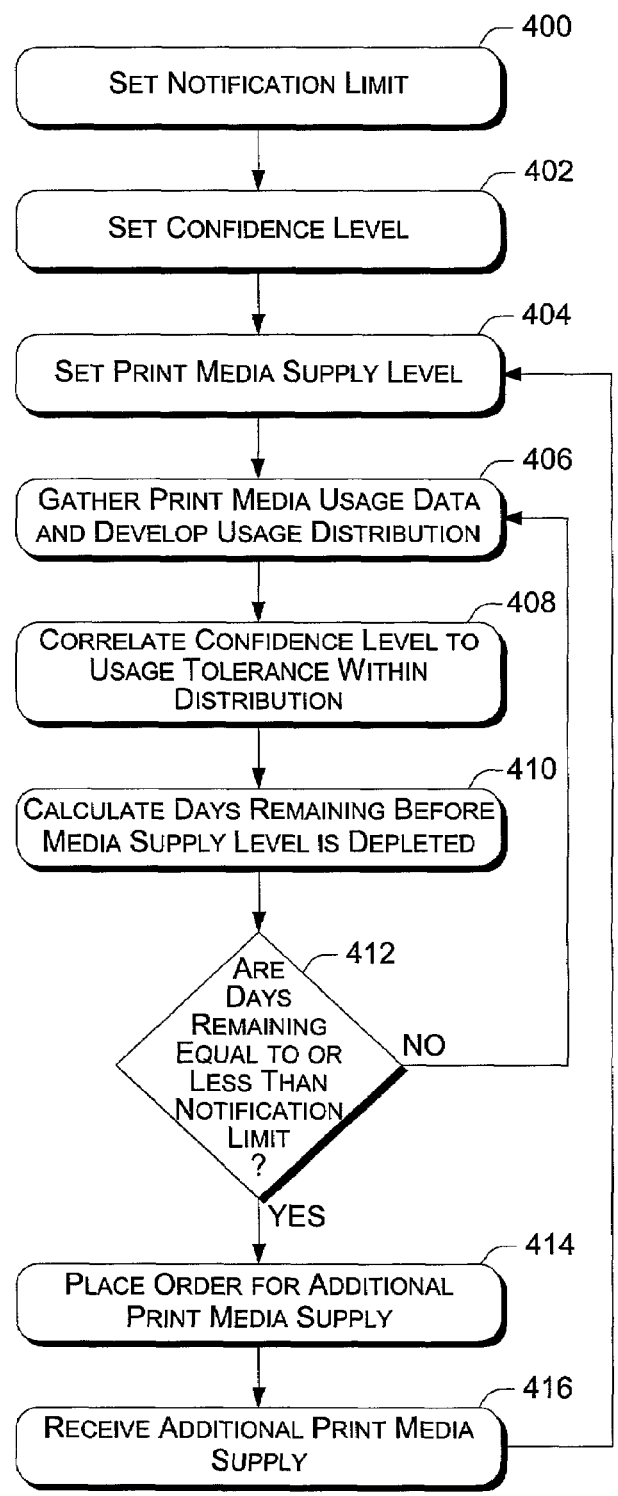
FIG. 4 is a flow diagram illustrating an example method of automatically ordering print media supplies.

FIG. 4 is a flow diagram illustrating an example of a general method for automatically determining when additional print media supplies should be ordered in a printer system 100 such as that shown in FIGS. 1 and 2. Operations included in the method of FIG. 4 are typically implemented on either a print device 102 or a host computer 108 of system 100. However, the method operations of FIG. 4 are not limited to being performed on a single device, but can also be performed alternately between devices such as print device 102 and host computer 108.

The example method of FIG. 4 begins at operation 400 with setting a notification limit. A notification limit is generally the number of days that transpire between the time an order for print media supplies is placed and the time the supplies are received. If "X" is the notification limit, the system 100 knows to place an order for more print media supplies "X" number of days before the day the system 100 projects that the current print media supply level will be depleted. Therefore, ideally, the additional print media supplies should arrive just as the current supply is being exhausted. A system 100 user familiar with the normal ordering process through a particular vendor 104 will know what value to set for the notification limit.

The method of FIG. 4 continues at operation 402 with setting a user confidence level. A user confidence level is a number that indicates what percentage of print media orders a user is willing to receive after a current print media supply is depleted. For example, a 99% confidence level means the user is willing to run out of print media 1 time in every 100 order occurrences. As discussed above, the tradeoff for setting a high confidence level is that the system 100 will place print media orders in a conservative manner that is more likely to result in a higher and more costly print media inventory.

At operation 404, an initial print media supply level is set. This level is usually the normal amount of print media ordered from the vendor 104. When the system 100 places an automatic order, the default amount of print media ordered is the same as the initial print media supply level setting. However, the system 100 can also be configured to query the user about preferred order amounts prior to automatically placing each order.

The system 100 gathers data on the amounts of print media being used by the print device 102 and develops a statistical distribution as to the daily print media usage at operation 406. At operation 408, the confidence level from operation 402 is correlated with a usage tolerance from the daily media usage distribution of operation 406. The correlation is typically made through a look-up table stored in the memory of the print device 102 or host computer 108. The correlated usage tolerance provides an estimated daily usage number as the amount of print media being used per day. The estimated daily usage number will be used in calculating how many days remain before the initial print media supply will be depleted. At operation 410, the calculation is performed that determines the number of days remaining before the initial supply will be depleted.

The system 100 then checks the days remaining against the notification limit (operation 400) at operation 412. If the number of days remaining before the print media supply level is depleted is equal to or less than the number of days set for the notification limit, the system 100 automatically places an order for additional print media supplies at operation 414. Typically, placing an automatic order involves retrieving a vendor URL from memory (e.g., print device 102 memory 206 or the host computer 108 memory 224), contacting the vendor via a network 106, and transferring appropriate user identification and order detail information to the vendor over the network 106. In the alternative, the system 100 automatically warns the user at operation 414 that it is time to place a manual order for additional print media supplies. A manually placed order typically involves retrieving a vendor telephone number from memory, contacting the vendor by telephone, and transferring appropriate user identification and order detail information to the vendor over the telephone.

If, at operation 412, the number of days remaining is not equal to or less than the notification limit, then the system 100 continues to gather print media usage data (operation 406) and repeats the calculations of operations 408 and 410, and the comparison of operation 412. After a new print media order is received at operation 416, the print media supply level is reset at operation 404, and the method continues on indefinitely performing operations 404 through 416.

Figure 5:
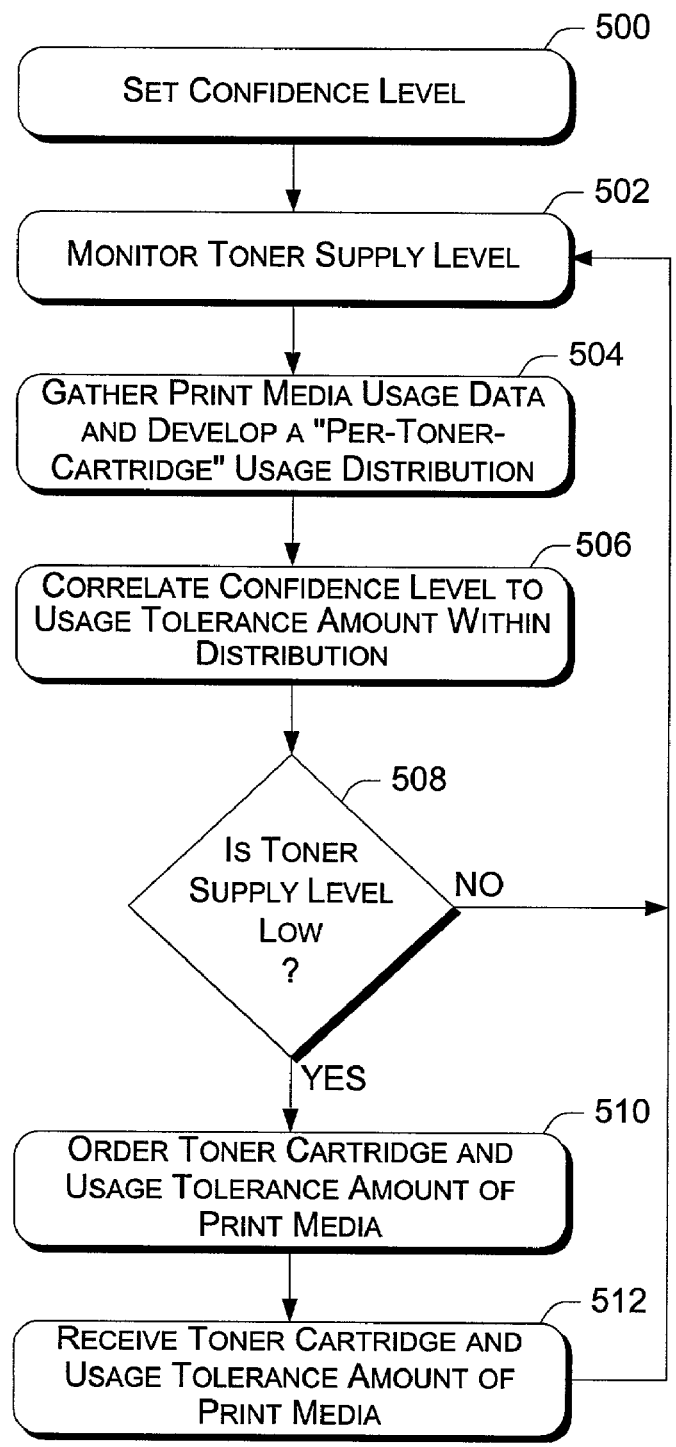
FIG. 5 is a flow diagram illustrating an alternate method of automatically ordering print media supplies.

FIG. 5 is a flow diagram illustrating an example of a general method for automatically determining the timing and quantity of print media supply orders placed in a system 100 such as that shown in FIGS. 1 and 3. The timing and quantity of orders are determined on a per-toner-cartridge basis.

The example method of FIG. 5 begins at operation 500 with setting a user confidence level. As discussed above, a confidence level is a number that indicates what percentage of print media orders a user is willing to receive after a current print media supply is depleted. The method continues with monitoring a toner supply 310 level at operation 502.

The system 100 gathers data on the amounts of print media being used by the print device 102 and develops a statistical distribution of the amount of print media used per toner cartridge 214 at operation 504. At operation 506, the confidence level from operation 500 is correlated with a usage tolerance from the toner cartridge usage distribution of operation 504. The correlation is typically made through a look-up table stored in the memory of the print device 102 or host computer 108. The correlated usage tolerance provides an estimated usage number for the amount of print media being used by a toner cartridge 214. The estimate is based on print media usage data from all toner cartridges up through the current toner cartridge 214.

The method continues at operation 508 with the system 100 checking for a low toner supply 310 level. If the toner supply 310 level is low, at operation 510 the system 100 orders a new toner cartridge 214 along with the usage tolerance amount of print media that correlates with the user confidence level. It is noted that although a toner low signal is the trigger event for the automatic order process, other predefined or user-defined events related to the toner cartridge 214 (or other marking agent consumable) could be used as the trigger event. If the toner supply 310 level is not low, the system 100 repeats operations 502 through 508 until the detector 216 on toner cartridge 214 signals a low toner supply 310. After a new toner cartridge and print media order is received at operation 512, the method continues on indefinitely performing operations 502 through 512.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
setting parameters for ordering print media, said parameters including a confidence level;
gathering daily print media usage data;
developing a usage distribution from the usage data;
correlating one or more of the parameters including said confidence level with the usage distribution to determine a usage tolerance; and
from the usage tolerance and one or more of the parameters, calculating a date when a current supply of print media will be depleted.

2. A method as recited in claim 1, further comprising:
automatically placing an order for an additional supply of print media such that the additional supply of print media is received prior to the date.

3. A method as recited in claim 2, further comprising:
resetting one or more of the parameters upon receiving the additional supply of print media.

4. A method as recited in claim 2, wherein the automatically placing an order further comprises:
retrieving a uniform resource locator (URL) for a vendor;
contacting the vendor by way of the URL; and
transferring user identification and order detail information to the vendor.

5. A method as recited in claim 1, further comprising:
warning a user to manually place an order for an additional supply of print media such that the additional supply of print media is received prior to the date.

6. A method as recited in claim 5, further comprising:
resetting one or more of the parameters upon receiving the additional supply of print media.

7. A method as recited in claim 5, wherein the warning further comprises:
retrieving a telephone number for a vendor;
contacting the vendor by way of the telephone number; and
transferring user identification and order detail information to the vendor.

8. A method as recited in claim 1, wherein the correlating further comprises:
accessing a look-up table that matches the one or more parameters to the usage tolerance.

9. A print device, having computer-readable media with computer-readable instructions for performing the method as recited in claim 1.

10. A computer, having computer-readable media with computer-readable instructions for performing the method as recited in claim 1.

11. A method comprising:
setting a notification limit;
setting a confidence level;
setting an initial media supply level;
gathering daily media usage data to develop a usage distribution;
correlating the confidence level to a daily usage tolerance within the usage distribution; and
from the initial media supply level and the media usage tolerance, calculating the days remaining before the initial media supply level is depleted.

12. A method as recited in claim 11, further comprising:
automatically placing an order for additional media supplies when the days remaining are equal to or less than the notification limit.

13. A method as recited in claim 12, further comprising:
resetting one or more of the parameters upon receiving the additional media supplies.

14. A method as recited in claim 12, wherein the automatically placing an order further comprises:
retrieving a uniform resource locator (URL) for a vendor;
contacting the vendor by way of the URL; and
transferring user identification and order detail information to the vendor.

15. A method as recited in claim 11, further comprising:
warning a user to manually place an order for additional media supplies when the days remaining are equal to or less than the notification limit.

16. A method as recited in claim 15, further comprising:
resetting one or more of the parameters upon receiving the additional media supplies.

17. A method as recited in claim 11, wherein the calculating further comprises:
subtracting a multiple of the daily usage tolerance from the initial media supply level to determine a remaining supply level; and
dividing the remaining supply level by the daily usage tolerance.

18. A method as recited in claim 17, wherein the multiple is equal to the number of days elapsed between setting the initial media supply level and the calculating.

19. A method as recited in claim 11, wherein the correlating further comprises:

accessing a look-up table that matches the confidence level to the daily usage tolerance.

20. A print device, having computer-readable media with computer-readable instructions for performing the method as recited in claim 11.

21. A computer, having computer-readable media with computer-readable instructions for performing the method as recited in claim 11.

22. In a printing system having consumable print media and a cartridge with consumable marking agent, a method comprising:
setting parameters for ordering print media;
gathering daily print media usage data;
developing a per-cartridge usage distribution from the usage data;
correlating one or more of the parameters with the usage distribution to determine a usage tolerance;
wherein one of the parameters is a user confidence level, and wherein the correlating is correlating the user confidence level with the usage distribution to determine a usage tolerance;
detecting when a trigger event occurs within the cartridge;
placing an order for additional print media when the trigger event is detected; and
controlling the size of the order with the usage tolerance.

23. A printer comprising:
consumable print media; and
a printer controller configured to develop a usage distribution from daily print media usage data and correlate a user confidence level with the usage distribution to determine a usage tolerance;
the printer controller further configured to calculate a date when a current supply of print media will be depleted using the usage tolerance.

24. A printer as recited in claim 23, wherein the printer controller is further configured to automatically place an order for an additional supply of print media such that the additional supply of print media is received prior to the date.

25. A printer comprising:
a cartridge containing a consumable marking agent;
a detector to sense a level of marking agent within the cartridge;
a supply of consumable print media; and
a controller configured to place an order for additional print media when the detector senses a low level of marking agent, wherein the controller is further configured to develop a distribution of per-cartridge print media usage, correlate a confidence pars meter with the distribution to determine a usage tolerance, and control the size of the order based on the usage tolerance.

26. A system comprising:
a marking agent cartridge;
a detector to provide a sensed level of marking agent within the cartridge; and
a controller configured to develop a distribution of print media usage, correlate a confidence parameter with the distribution to determine a usage tolerance, and control the size of a print media order based on the usage tolerance;
the controller further configured to place the order when the detector senses a low level of marking agent.

27. A system as recited in claim 26, wherein the controller is a printer controller located on a print device.

28. A system as recited in claim 26, wherein the controller is a printer controller located on a host computer.

* * * * *

UNITED STATES PATENT AND TRADEMARK OFFICE
CERTIFICATE OF CORRECTION

PATENT NO. : 7,019,859 B2  
APPLICATION NO. : 09/879340  
DATED : March 28, 2006  
INVENTOR(S) : Quintin T. Phillips et al.

Page 1 of 1

It is certified that error appears in the above-identified patent and that said Letters Patent is hereby corrected as shown below:

In column 12, line 14, in Claim 25, delete "pars meter" and insert -- parameter --, therefor.

Signed and Sealed this

Eleventh Day of August, 2009

David J. Kappos
*Director of the United States Patent and Trademark Office*